United States Patent
Cheng

(10) Patent No.: US 9,680,298 B2
(45) Date of Patent: Jun. 13, 2017

(54) INPUT REDUNDANT CIRCUIT

(71) Applicant: Astec International Limited, Kowloon (HK)

(72) Inventor: Chung Yan Cheng, Kowloon (HK)

(73) Assignee: ASTEC INTERNATIONAL LIMITED, Kwun Tong, Kowloon (HK)

( * ) Notice: Subject to any disclaimer, the term of this patent is extended or adjusted under 35 U.S.C. 154(b) by 229 days.

(21) Appl. No.: 14/516,317

(22) Filed: Oct. 16, 2014

(65) Prior Publication Data

US 2015/0109708 A1    Apr. 23, 2015

(30) Foreign Application Priority Data

Oct. 21, 2013 (CN) .................. 2013 1 0495538

(51) Int. Cl.
*H02M 3/22* (2006.01)
*H02H 9/02* (2006.01)
*H02M 1/10* (2006.01)
*H02M 1/32* (2007.01)
*H02M 1/42* (2007.01)

(52) U.S. Cl.
CPC .............. *H02H 9/02* (2013.01); *H02H 9/025* (2013.01); *H02M 1/10* (2013.01); *H02M 1/32* (2013.01); *H02M 1/4208* (2013.01); *H02M 2001/325* (2013.01); *Y02B 70/126* (2013.01)

(58) Field of Classification Search
CPC ........ H02M 1/10; H02M 1/32; H02M 1/4208; H02M 3/22; H02M 2001/325; H02H 9/02; H02H 9/025; Y02B 70/126
USPC ........................................... 361/93.9
See application file for complete search history.

(56) References Cited

U.S. PATENT DOCUMENTS

| | | |
|---|---|---|
| 5,939,799 A | 8/1999 | Weinstein |
| 6,137,706 A | 10/2000 | Nesbitt et al. |
| 7,612,469 B2 | 11/2009 | Kuo |
| 2008/0247106 A1* | 10/2008 | Divan .............. H02H 9/001 361/58 |
| 2014/0077602 A1 | 3/2014 | Liu et al. |

* cited by examiner

*Primary Examiner* — Thienvu Tran
*Assistant Examiner* — Kevin J Comber
(74) *Attorney, Agent, or Firm* — Harness, Dickey & Pierce, P.L.C.

(57) ABSTRACT

An input redundant circuit according to the present disclosure may include: a core power supply unit; a first input port connected to a first input voltage; a second input port connected to a second input voltage; a relay unit connected to the first input port and the second input port to supply one of the first input voltage and the second input voltage to the core power supply unit; and a surge current limiting unit coupled to the relay unit, configured to limit a surge current generated when the relay unit is switched between the first input voltage and the second input voltage.

17 Claims, 11 Drawing Sheets

INPUT REDUNDANT CIRCUIT

CROSS-REFERENCE TO RELATED APPLICATION

This application claims the benefit and priority of Chinese Patent of Invention Application No. 201310495538.X filed Oct. 21, 2013. The entire disclosure of the above application is incorporated herein by reference.

FIELD

The present disclosure relates to the technical field of power supplies, and in particular to an input redundant circuit.

BACKGROUND

This section provides background information relating to the present disclosure, which is not necessarily prior art.

A conventional method for generating input redundancy, relates in general to two power supplies. The two power supplies run in parallel and the current is shared at the output port. In general, the conventional method uses different input power supplies, and even uses a battery backup power supply, such as an uninterruptible power supply (UPS). The use of two power supplies takes up more space, and thereby results in increased cost.

SUMMARY

This section provides a general summary of the present disclosure, and is not a comprehensive disclosure of its full scope or all of its features.

It is an object of the present disclosure to provide an input redundant circuit, which is capable of achieving input redundancy in a single power supply having two separate input voltages, and therefore decreasing the number of the power supply used in a system.

According to an aspect of the present disclosure, there is provided an input redundant circuit. The input redundant circuit includes: a core power supply unit; a first input port connected to a first input voltage; a second input port connected to a second input voltage; a relay unit connected to the first input port and the second input port to supply one of the first input voltage and the second input voltage to the core power supply unit; and a surge current limiting unit coupled to the relay unit, and configured to limit a surge current generated when the relay unit is switched between the first input voltage and the second input voltage.

Preferably, the relay unit may include: a normally-closed relay unit connected to the first input port; a normally-opened relay unit connected to the second input port; and a double-contact relay unit, wherein a normally-closed contact of the double-contact relay unit is connected to the normally-closed relay unit and a normally-opened contact of the double-contact relay unit is connected to the normally-opened relay unit.

Preferably, the relay unit may include: a first relay having a first normally-closed contact and a first normally-opened contact; and a second relay having a second normally-closed contact and a second normally-opened contact, wherein the first normally-closed contact and the second normally-closed contact are connected to the first input port, and the first normally-opened contact and the second normally-opened contact are connected to the second input port.

Preferably, the relay unit may include: a first normally-opened relay unit connected to the first input port; a second normally-opened relay unit connected to the second input port; and a double-contact relay unit, wherein a normally-closed contact of the double-contact relay unit is connected to the first normally-opened relay unit and a normally-opened contact of the double-contact relay unit is connected to the second normally-opened relay unit, and the input redundant circuit may further include: a first relay drive unit coupled to the first input port to drive the first normally-opened relay unit by means of the first input voltage; and/or a second relay drive unit coupled to the second input port to drive the second normally-opened relay unit by means of the second input voltage.

Preferably, the input redundant circuit may further include: an auxiliary power supply circuit coupled to the second input port to supply a bias power to the core power supply unit by means of the second input voltage.

Preferably, the relay unit may include: a first normally-opened relay unit connected to the first input port; a second normally-opened relay unit connected to the second input port; and a double-contact relay unit, wherein a normally-closed contact of the double-contact relay unit is connected to the first normally-opened relay unit and a normally-opened contact double-contact relay unit is connected to the second normally-opened relay unit, and the input redundant circuit may further include: a first auxiliary power supply circuit coupled to the first input port to supply a bias power to the core power supply unit by means of the first input voltage; and/or a second auxiliary power supply circuit coupled to the second input port to supply a bias power to the core power supply unit by means of the second input voltage.

Preferably, the input redundant circuit may further include: a first sensing unit coupled to the first input port to sense whether the first input voltage works properly, and supply a first sense signal to the core power supply unit for indicating whether the first input voltage works properly; and a second sensing unit coupled to the second input port to sense whether the second input voltage works properly, and supply a second sense signal to the core power supply unit for indicating whether the second input voltage works properly.

Preferably, the relay unit may be configured to supply the first input voltage to the core power supply unit by default, and the core power supply unit may be configured to control, based on the first sense signal and the second sense signal, the relay unit to be switched from one of the first input voltage and the second input to the other of the first input voltage and the second input voltage.

Preferably, the core power supply unit may include: a control unit configured to generate a first control signal and a second control signal, wherein the first control signal is used to control the relay unit to be disconnected from one of the first input voltage and the second input voltage, and the second control signal is used to control the relay unit to be connected to the other of the first input voltage and the second input voltage; a boosting unit configured to boost one of the first input voltage and the second input voltage supplied by the relay unit; and a high-capacity capacitor unit powered by the boosting unit.

Preferably, the control unit may disable the boosting unit before the relay unit is disconnected from the one of the first input voltage and the second input voltage in response to the first control signal.

Preferably, the control unit may enable the boosting unit after the relay unit is connected to the other of the first input voltage and the second input voltage in response to the second control signal.

Preferably, the surge current limiting unit may generate, based on a capacitance-voltage supplied by the high-capacity capacitor unit and a supply voltage which is the other of the first input voltage and the second input voltage, a surge current limiting signal for indicating a period of time during which the supply voltage is less than the capacitance-voltage, and the control unit may generate, based on the surge current limiting signal, the second control signal to control the relay unit to be connected to the other of the first input voltage and the second input voltage in the period of time.

Preferably, the surge current limiting unit may include: a surge current limiting circuit coupled to the relay unit, and configured to limit a surge current generated by the first input voltage and the second input voltage; and an acceleration circuit connected with the surge current limiting circuit in parallel, and configured to shorten the connection time of the surge current limiting circuit.

Preferably, the acceleration circuit may be disconnected before the control unit generates the first control signal, and be connected after the control unit generates the second control signal, and the surge current limiting circuit may include: a limiting relay disconnected before the acceleration circuit is disconnected, and connected after the acceleration circuit is connected; and a limiting resistor connected with the limiting relay in parallel, and configured to limit the surge current.

Preferably, the acceleration circuit may include a semiconductor device.

The input redundant circuit according to the present disclosure is capable of achieving input redundancy in a single power supply having two separate input voltages. The two input voltages may be two alternating current (AC) voltage inputs, alternatively may be an AC voltage input and a high-voltage direct current (DC) input, or alternatively may be two high-voltage DC inputs. Thus, not only the total cost can be reduced, but also the total power loss of these power supplies inside the system can be reduced. Additionally, the number of the power supply required in the system is decreased, and therefore less space is required to hold these power supplies. Finally, the size of the system can be reduced.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. In the drawings.

Figure 1:
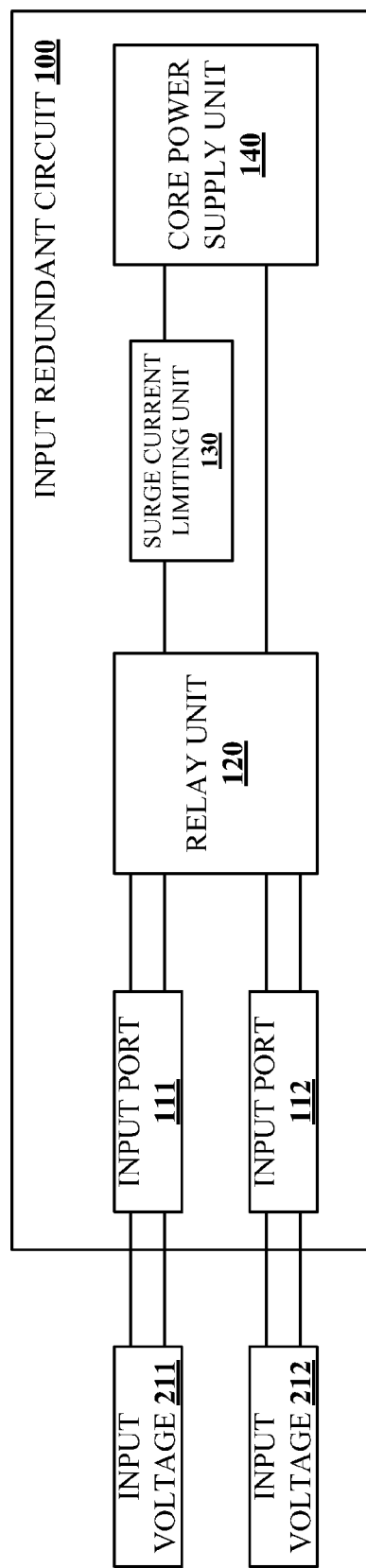
FIG. 1 is a block diagram illustrating an input redundant circuit according to an embodiment of the present disclosure.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

As shown in FIG. 1, an input redundant circuit 100 according to an embodiment of the present disclosure may include input ports 111 and 112, a relay unit 120, a surge current limiting unit 130 and a core power supply unit 140.

The input port 111 may be connected to an input voltage 211, and the input port 112 may be connected to an input voltage 212.

The relay unit 120 may be connected to the input ports 111 and 112 to supply one of the input voltage 211 and the input voltage 212 to the core power supply unit 140.

The surge current limiting unit 130 may be coupled to the relay unit 120 and may be configured to limit a surge current generated when the relay unit 120 is switched between the input voltage 211 and the input voltage 212.

The input redundant circuit 100 according to the embodiment of the present disclosure is capable of achieving input redundancy in a single power supply having two separate input voltages 211 and 212. Thus, not only the total cost can be reduced, but also the total power loss of these power supplies inside the system can be reduced. Additionally, the number of the power supply required in the system is decreased, and therefore less space is required to hold these power supplies. Finally, the size of the system can be reduced.

Figure 2:
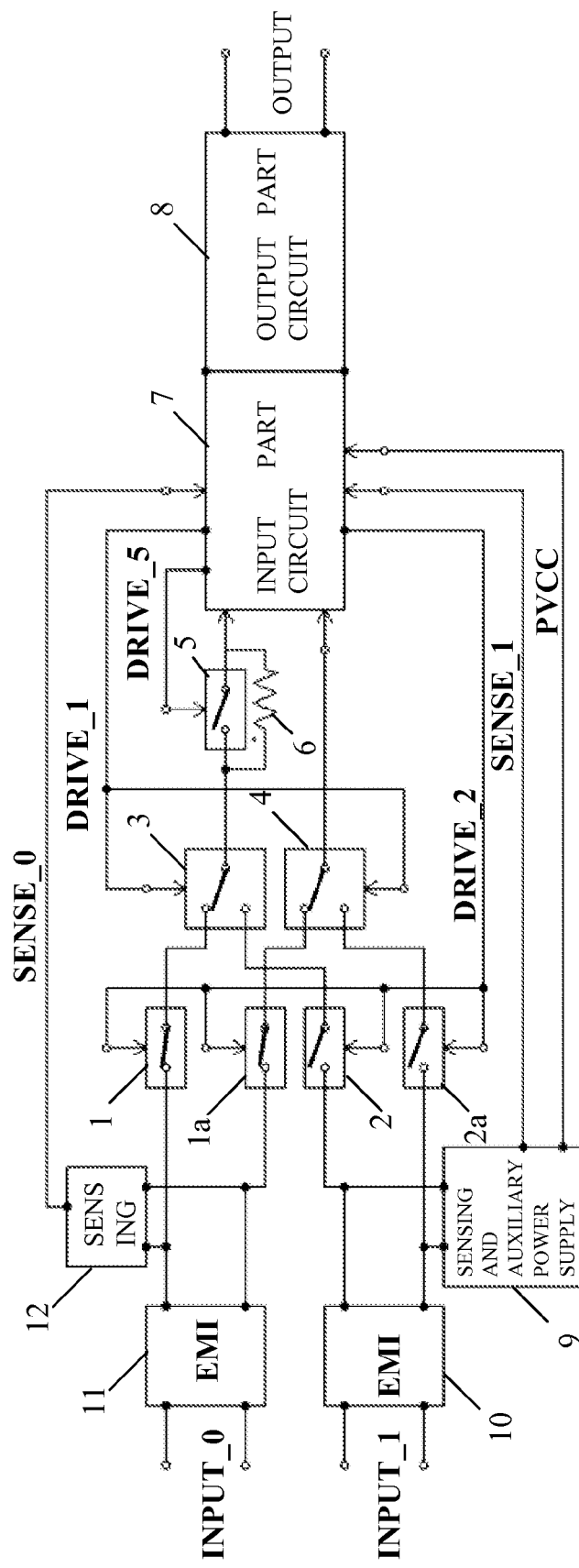
FIG. 2 is a schematic diagram illustrating an input redundant circuit according to an embodiment of the present disclosure.

The embodiment of the disclosure is described in detail with reference to FIG. 2 hereinafter. FIG. 2 illustrates an input redundant circuit according to the embodiment of the present disclosure. As shown in FIG. 2, the input redundant circuit according to the embodiment of the present disclosure may include relays 1, 1*a*, 2, 2*a*, 3, 4 and 5, a resistor 6, an input part circuit 7, an output part circuit 8, a sensing and auxiliary power supply circuit 9, electromagnetic interference filters (EMI) 10 and 11, and a sensing circuit 12.

EMI 10 and EMI 11 may be connected to an input voltage INPUT_1 and an input voltage INPUT_0, respectively. EMI 10 and EMI 11 may be used to prevent electromagnetic noise from the core power supply from entering commercial AC lines. EMI 10 and EMI 11 function as input ports herein. The input voltage INPUT_1 and the input voltage INPUT_0 may also be connected to the input redundant circuit according to the embodiment of the present disclosure directly or in other ways, to which the present disclosure has no specific limitation.

EMI 11 couples the input voltage INPUT_0 to the relays 1 and 1*a*. The relays 1 and 1*a* are normally-closed relays and constitute a normally-closed relay unit. EMI 10 couples the input voltage INPUT_1 to the relays 2 and 2*a*. The relays 2 and 2*a* are normally-opened relays and constitute a normally-opened relay unit.

The relays 3 and 4 are double-contact relays and constitute a double-contact relay unit. Specifically, the relays 3 and 4 may be single-pole double-throw (SPDT) relays or double-pole double-throw (DPDT) relays. A normally-closed contact of the relay 3 is connected to the relay 1, and a normally-opened contact of the relay 3 is connected to the relay 2. The normally-closed contact of the relay 4 is connected to the relay 1*a*, and the normally-opened contact of the relay 4 is connected to the relay 2*a*.

The relay 5 is a normally-opened relay and coupled to the relay 3. The resistor 6 and the relay 5 are connected in parallel. Specifically, the resistor 6 may be a common resistor or a thermal resistor. The resistor 6 and the relay 5 make up a surge current limiting circuit.

The relays 3 and 4 may supply one of the input voltage INPUT_1 and the input voltage INPUT_0 to the input part circuit 7. The input part circuit 7 and the output part circuit 8 constitute a core power supply unit.

The sensing circuit 12 as a sensing unit is coupled to EMI 11 to sense whether the input voltage INPUT_0 works properly, and supply a sense signal SENSE_0 for indicating whether the input voltage INPUT_0 works properly to the input part circuit 7.

The sensing and auxiliary power supply circuit 9 as a sensing unit and an auxiliary power supply circuit is coupled to the EMI 10. As the sensing unit, the sensing and auxiliary power supply circuit 9 may sense whether the input voltage INPUT_1 works properly, and supply a sense signal SENSE_1 for indicating whether the input voltage INPUT_1 works properly to the input part circuit 7. As the auxiliary power supply circuit, the sensing and auxiliary power supply circuit 9 may supply a bias power PVCC to the input part circuit 7 by means of the input voltage INPUT_1.

Since the relays 1 and 1*a* are normally-closed relays and the normally-closed contacts of the relays 3 and 4 are connected to the relay 1 and the relay 1*a*, respectively, the input voltage INPUT_0 is supplied to the input part circuit 7 by default.

The input part circuit 7, automatically or based on the sense signals SENSE_0 and SENSE_1, may control the relay unit constituted of the relays 1, 1*a*, 2, 2*a*, 3 and 4, to switch from one of the input voltage INPUT_1 and the input voltage INPUT_0 to the other of the input voltage INPUT_1 and the input voltage INPUT_0.

In the case that each time a user supplies the input voltage INPUT_0 to power the entire circuit, it is not necessary to provide the auxiliary power supply circuit part in the sensing and auxiliary power supply circuit 9, since the input voltage INPUT_0 is supplied to the input part circuit 7 by default. In this case, only the sensing circuit needs to be provided for the input voltage INPUT_1. The sensing circuit may be the same as the sensing circuit 12 for the input voltage INPUT_0.

However, some users may need to power the entire circuit in the case that there is only the input voltage INPUT_1. In this case, it is necessary to provide the auxiliary power supply circuit part in the sensing and auxiliary power supply circuit 9.

Specifically, in the case that there is only the input voltage INPUT_1 and no input voltage INPUT_0 when the core power supply unit is enabled, the only way to power the core power supply unit is to supply the bias power PVCC by means of the auxiliary power supply circuit part in the sensing and auxiliary power supply circuit 9. Otherwise, the core power supply unit can not be powered in the case that there is only the input voltage INPUT_1, since the relays 2 and 2*a* are normally-opened relays and the normally-opened contacts of the relays 3 and 4 are connected to the relay 2 and the relay 2*a*, respectively.

On the other hand, in the case that there is the input voltage INPUT_0 when the core power supply unit is enabled, the core power supply unit may be powered by the input voltage INPUT_0 and generate a bias power by itself. In this case, the bias power PVCC from the auxiliary power supply circuit part in the sensing and auxiliary power supply circuit 9 becomes useless.

The bias power PVCC is a primary bias power supplied to a primary-side control circuit of the core power supply unit. The bias power PVCC may include more than one bias voltage, such as 12 V and a relay drive voltage (depending on the relay). In the case that there is only the input voltage INPUT_1 and no input voltage INPUT_0 when the core power supply unit is enabled, the bias power PVCC from the auxiliary power supply circuit part in the sensing and auxiliary power supply circuit 9 may awaken the primary-side control circuit of the core power supply unit. Then the input voltage INPUT_1 may be further connected to the core power supply unit.

The details of the sensing circuit 12 and the sensing and auxiliary power supply circuit 9 may be achieved in a way well-known to those skilled in the art, which is not described in detail herein.

In the case that both the input voltage INPUT_1 and the input voltage INPUT_0 exist, the input voltage INPUT_0 may be connected to the input part of the core power supply unit, i.e. the input part circuit 7. The input voltage INPUT_0 may supply power to the core power supply unit. In this case, the input voltage INPUT_1 may be isolated from the input part circuit 7 and the input voltage INPUT_0 by means of the normally-opened relays 2 and 2a and the normally-opened contacts of the relays 3 and 4.

The input level of both the input voltage INPUT_1 and the input voltage INPUT_0 may be reflected by the sense signals SENSE_0 and SENSE_1, respectively. Even though one of the input voltage INPUT_1 and the input voltage INPUT_0 is not connected to the input part circuit 7, the input part circuit 7 may learn whether both the input voltage INPUT_1 and the input voltage INPUT_0 work properly. For example, in the case that the input voltage INPUT_0 becomes bad (the signal is lost or weakened), the input part circuit 7 may send drive signals such as DRIVE_1 and DRIVE_2 to activate the relay unit constituted of the relays 1, 1a, 2, 2a, 3 and 4, to connect the input voltage INPUT_1 to the input part circuit 7. In this case, the input voltage INPUT_0 may be isolated from the rest of the circuit. Thus, the input redundancy is achieved in the case that it is not necessary to have two core power supplies.

It should be noted that the input voltage INPUT_1 and the input voltage INPUT_0 may be two AC inputs, alternatively a AC input and a high-voltage DC input (such as 240 V DC), or alternatively two high-voltage DC inputs (such as 240 V DC).

The arrangement of relays as shown in FIG. 2 may prevent the input voltage INPUT_1 and the input voltage INPUT_0 from being shorted due to an incorrect control sequence, and only one of the input voltage INPUT_1 and the input voltage INPUT_0 may be connected to the input part circuit 7 at any time.

In the relay unit constituted of the relays 1, 1a, 2, 2a, 3 and 4, the relays 1, 1a, 2 and 2a may be used to supply adequate space between the input voltage INPUT_1 and the input voltage INPUT_0 to meet the requirement for security isolation. In general, it should be meet that there is a space of approximately 4 mm between the input voltage INPUT_1 and the input voltage INPUT_0.

In the case that the space is inadequate, more relays may be connected with the relays 1, 1a, 2 and 2a in serial, all of which have the same drive signal. The relays 1, 1a, 2 and 2a shown in FIG. 2 are separated relays, but the present disclosure is not limited thereto. For example, the relays 1 and 1a may be a single relay. Similarly, the relays 2 and 2a, the relays 1 and 2, the relays 1a and 2a and the like may also be a single relay.

In addition, the sense signals SENSE_0 and SENSE_1 and the bias power PVCC are also isolated from the input voltage INPUT_1 and the input voltage INPUT_0. For example, the sense signals SENSE_0 and SENSE_1 may be isolated from the input voltage INPUT_1 and the input voltage INPUT_0 by means of a photo-coupler or a certain isolation driver. Additionally, the bias power PVCC may come from the transformer winding of the auxiliary power supply circuit, and therefore the bias power PVCC may be isolated from the input voltage INPUT_1 and the input voltage INPUT_0. Such isolation is necessary for safety.

The core power supply unit according to the embodiment of the present disclosure may be a common power supply. The power supply may have a boosting power factor correction (PFC) or a DC boosting circuit at the front side (for example, the input part circuit 7).

Figure 3:
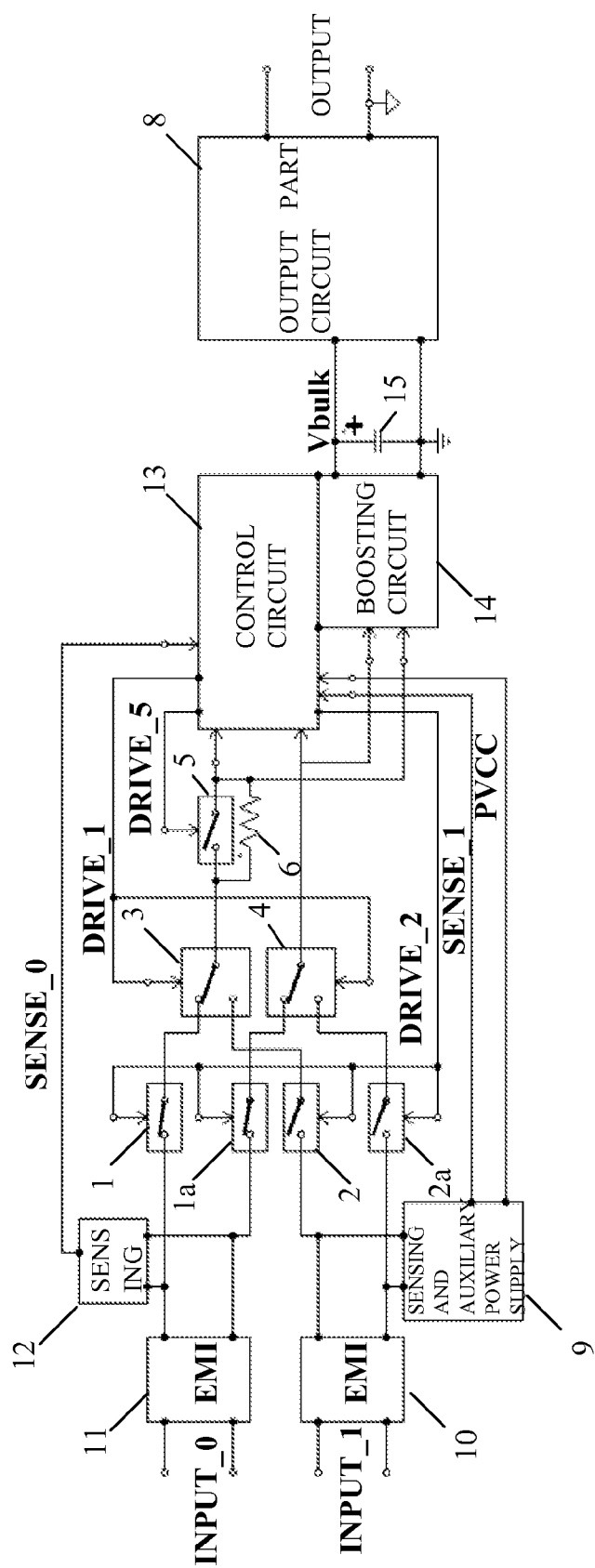
FIG. 3 is a schematic diagram illustrating an input redundant circuit according to an embodiment of the present disclosure.

In the input redundant circuit as shown in FIG. 3, the input part circuit 7 shown in FIG. 2 is replaced by a control circuit 13, a boosting circuit 14 and a capacitor 15. The rest of the input redundant circuit shown in FIG. 3 is the same as that in FIG. 2, which is not repeated any more herein.

As shown in FIG. 2 and FIG. 3, the core power supply unit (the input part circuit) in the input redundant circuit according to the embodiment of the present disclosure may include the control circuit 13 as a control unit, the boosting circuit 14 as a boosting unit and the capacitor 15 as a high-capacity capacitor unit.

The control circuit 13 may generate control signals DRIVE_1 and DRIVE_2. The control signal DRIVE_1 may control the relays 3 and 4, so that the normally-closed contacts of the relays 3 and 4 are disconnected and the normally-opened contacts of the relays 3 and 4 are connected, or conversely, the normally-closed contacts of the relays 3 and 4 are connected and the normally-opened contacts of the relays 3 and 4 are disconnected. In the case that the normally-closed contacts of the relays 3 and 4 are disconnected, the relays 3 and 4 are disconnected from the input voltage INPUT_0.

The control signal DRIVE_2 may control the relays 1, 1a, 2 and 2a, so that the normally-closed relays 1 and 1a are disconnected and the normally-opened relays 2 and 2a are connected, or conversely, the normally-closed relays 1 and 1a are connected and the normally-opened relays 2 and 2a are disconnected. In the case that the normally-opened contacts of the relays 3 and 4 are connected and the normally-opened relays 2 and 2a are connected, the relays 3 and 4 are connected to the input voltage INPUT_1.

The boosting circuit 14 may boost one of the input voltage INPUT_0 and the input voltage INPUT_1 supplied by the relay unit. The capacitor 15 is powered by the boosting circuit 14 to generate a capacitance-voltage Vbulk.

The boosting circuit 14 may be a boosting PFC or a DC boosting circuit. Since the common input AC voltage ranges from 180 Vac to 264 Vac (which is an AC of wide range), the peak value of the input voltage is approximately 374 V. In order to maintain the power factor correction function under the input of 264 Vac, the output of the PFC circuit must be higher than 374 V. The level of the common output voltage ranges from 380 V to 400 V. For the higher maximum AC input, the output voltage of PFC is required to be boosted.

Furthermore, with the boosted voltage, the much lower high-capacity capacitance value may be used to maintain time requirement (which is generally 12 ms) easily. Further, in the case that the voltage Vbulk at the high-capacity capacitor (i.e. the capacitor 15) is adjusted, the design of the output part circuit 8 may be optimized.

PFC may force the waveform of the input current to follow the waveform of the input voltage, so that the power factor approaches to 1. In general, the input of PFC may be a full-wave rectified sine wave and the output of PFC may be a DC high voltage, such as 395 Vdc. In theory, PFC may accept positive voltage waveform in any shape, including pure DC voltage, and output a DC high voltage.

The DC boosting circuit may accept a DC input voltage such as 240 Vdc, and gradually increase the DC input voltage to a higher voltage such as 395 Vdc. The voltages 240 Vdc and 395 Vdc are just an example here, to which the present disclosure has no specific limitation.

The details of the boosting circuit 14 as the boosting PFC or the DC boosting circuit may be achieved in a way well-known to those skilled in the art, to which the present disclosure has no specific limitation.

The capacitor 15 is referred to as a high-capacity capacitor. In the case that the AC/DC input of the output part circuit 8 is lost, the capacitor 15 may be used to maintain the output part circuit 8 to run for a period of time, such as 12 ms. This period of time (12 ms) is referred to as "holding time".

The output part circuit 8 may be a decreasing DC/DC converter with a transformer. The transformer may provide security isolation and part of voltage decreasing function. The input of the output part circuit 8 is connected to the output of boosting circuit 14 (the capacitor 15). The output part circuit 8 may decrease gradually the DC high voltage to a DC low voltage such as 12 Vdc, 5 Vdc. The details of the output part circuit 8 may be achieved in a way well-known to those skilled in the art, to which the present disclosure has no specific limitation.

Next, the function of the surge current limiting circuit formed of the relay 5 and the resistor 6 is described in detail.

In a common power supply circuit, the surge current limiting circuit is used to limit the surge current generated when an AC input voltage is applied to the power supply circuit. The operation of the surge current limiting circuit is as follows. Before the AC input voltage is applied, a surge relay (such as the relay 5) may be disconnected, so that all current may flow through a current limiting resistor (such as the resistor 6), and therefore the high-capacity capacitor (such as the capacitor 15) is charged during a first stage. After the high-capacity capacitor is charged and the input current becomes low, the surge relay may be connected to bypass the current limiting resistor. In the case that the AC input voltage is broken off and the power supply circuit stops working, the surge relay may be disconnected.

In the case that the input voltage is higher than the voltage Vbulk at the capacitor 15, the surge current may be generated. The input redundant circuit according to the embodiment of the present disclosure may prevent the surge current from being generated when the relay unit is switched between the input voltage INPUT_0 and the input voltage INPUT_1.

As an example, as shown in FIG. 3, in the case that both the input voltage INPUT_1 and the input voltage INPUT_0 exist, the input voltage INPUT_0 may be autonomously connected to the input part circuit (that is, the control circuit 13 and the boosting circuit 14) of the core power supply unit. The input voltage INPUT_0 may supply power to the core power supply unit, and the relay 5 may be closed after the capacitor 15 is peak charged. The boosting circuit 14 then may boost the capacitance-voltage Vbulk to a higher voltage (for example, 395 Vdc). The input voltage INPUT_1 may be isolated from the core power supply unit and the input voltage INPUT_0 by means of the normally-opened relays 2 and 2a and the normally-opened contacts of the relays 3 and 4. In the case that the input voltage INPUT_0 becomes bad (the signal is lost or weakened), the control circuit 13 may send drive signals such as DRIVE_1 and DRIVE_2 to activate the relay unit constituted of the relays 1, 1a, 2, 2a, 3 and 4, to connect the input voltage INPUT_1. However, during the switching from the input voltage INPUT_0 to the input voltage INPUT_1, the capacitance-voltage Vbulk may drop after the input voltage INPUT_0 is disconnected. When the input voltage INPUT_1 is connected, the surge current may be generated in the case that the instant voltage of the input voltage INPUT_1 is higher than the capacitance-voltage Vbulk. In the case that the generated surge current is not limited, the input redundant circuit may be damaged.

In order to limit the surge current generated when the relay unit is switched between the input voltage INPUT_0 and the input voltage INPUT_1, firstly the control circuit 13 may disable the boosting circuit 14 before the control circuit 13 sends a control signal to disconnect the input voltage INPUT_0 in the case that the input voltage INPUT_0 becomes bad (the signal is lost or weakened), so that the input current is stopped to flow before any relay is activated. In this case, the breaking current at the relays can be avoided.

In a nominal input line (180 Vac to 264 Vac), the capacitance-voltage Vbulk is always higher than the input voltage. Therefore the disabling of the boosting circuit 14 may stop the input current immediately. Since there is no input current actually, the breaking current of the relays can be avoided.

Next, the control circuit 13 may send the control signal DRIVE_1 to activate the relays 3 and 4. The normally-closed contacts of the relays 3 and 4 may be opened, and the normally-opened contacts of the relays 3 and 4 may be closed.

Next, the control circuit 13 may send the control signal DRIVE_2 to activate the relays 1, 1a, 2 and 2a. The relays 1 and 1a may be disconnected, and the relays 2 and 2a may be closed.

Figure 4:
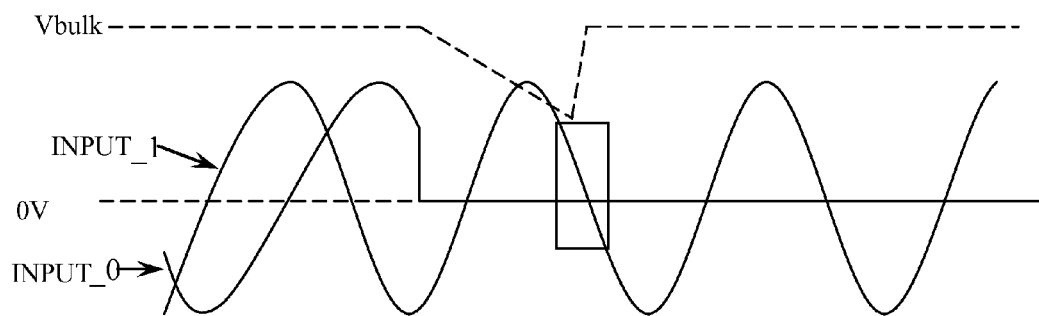
FIG. 4 is a schematic diagram illustrating the working principle of a surge current limiting unit included in an input redundant circuit according to an embodiment of the present disclosure.

In order to prevent the surge current from being generated due to the instant voltage of the input voltage INPUT_1 connected when the contacts of the relays 2 and 2a are closed which is higher than the capacitance-voltage Vbulk, the control signal DRIVE_2 should be sent out in a point where the relays 2 and 2a may be closed at the region around the zero crossing point of the input voltage INPUT_1, indicated by the rectangle block as shown in FIG. 4.

To implement this, the surge current limiting unit included in the input redundant circuit according to the embodiment of the present disclosure may generate a surge current limiting signal based on the supply voltage of the input voltage INPUT_1 (for example, learned by the sense signal SENSE_1) and the capacitance-voltage Vbulk supplied by the capacitor 15. The surge current limiting signal indicates the period of time during which the supply voltage of the input voltage INPUT_1 is less than the capacitance-voltage Vbulk. Based on the surge current limiting signal, the control unit (for example the control circuit 13) included in the core power supply unit may generate the control signal DRIVE_2 to control the relay unit (for example the relays 2 and 2a), so that the relay unit is connected to the input voltage INPUT_1 in the period of time during which the supply voltage of the input voltage INPUT_1 is less than the capacitance-voltage Vbulk. Thus, high current flowing (the surge current) is avoided which is generated when the contacts of the relay unit are closed.

Next, the boosting circuit 14 may be enabled before or after the control circuit 13 generates the control signal DRIVE_2, depending on the peak current limiting of the boosting circuit 14. Therefore the switching is achieved from the input voltage INPUT_0 to the input voltage INPUT_1.

Figure 5:
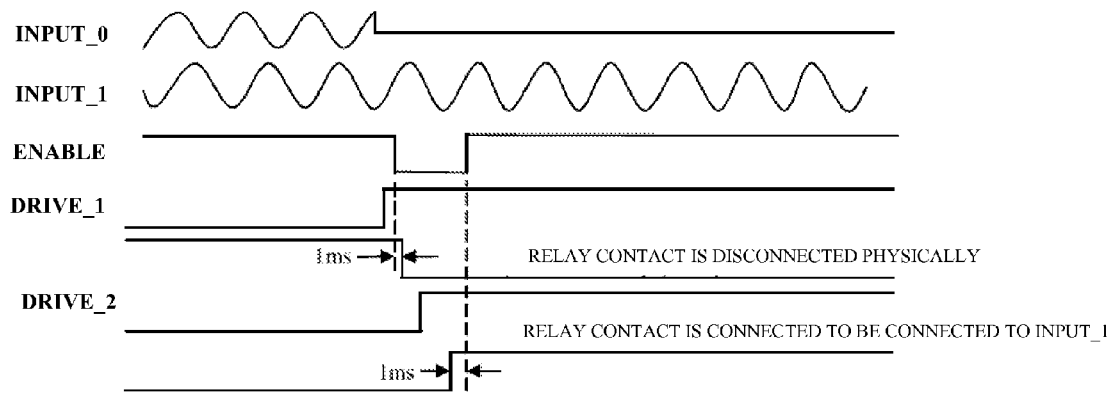
FIG. 5 is a waveform graph illustrating the operation of an input redundant circuit according to an embodiment of the present disclosure.

The switching from the input voltage INPUT_0 to the input voltage INPUT_1 described above can be further understood with reference to FIG. 5. FIG. 5 illustrates the waveform graph for the operation of the input redundant circuit according to an embodiment of the present disclosure. As shown in FIG. 5, the normally-closed contacts of the relays 3 and 4 may be opened physically and the normally-opened contacts of the relays 3 and 4 may be closed physically in response to the control signal DRIVE_1 sent by the control circuit 13, at 1 ms after the boosting circuit 14 is disabled. Then the relays 1 and 1a are disconnected physically and the relays 2 and 2a may be connected physically in response to the control signal DRIVE_2 sent by the control circuit 13, to connect the input voltage INPUT_1. The boosting circuit 14 is enabled again at 1 ms after the input voltage INPUT_1 is connected. The 1 ms is just as an example here, to which the present disclosure has no specific limitation.

The control signal DRIVE_2 may be sent together with the control signal DRIVE_1 depending on different design and requirement. Furthermore, the order in which the control signal DRIVE_1 and the control signal DRIVE_2 are sent may be reversed. There is no particular limitation for the order in which the control signal DRIVE_1 and the control signal DRIVE_2 are sent in the present disclosure, as long as it is ensured that the instant voltage of the input voltage INPUT_1 connected when the contacts of the relay unit are closed is lower than the capacitance-voltage Vbulk.

With the above-mentioned input redundant circuit according to the embodiment of the present disclosure, the breaking current of the relay unit can be avoided, and the current can be limited to a controllable low level when the contacts of the relay unit are closed.

Figure 6:
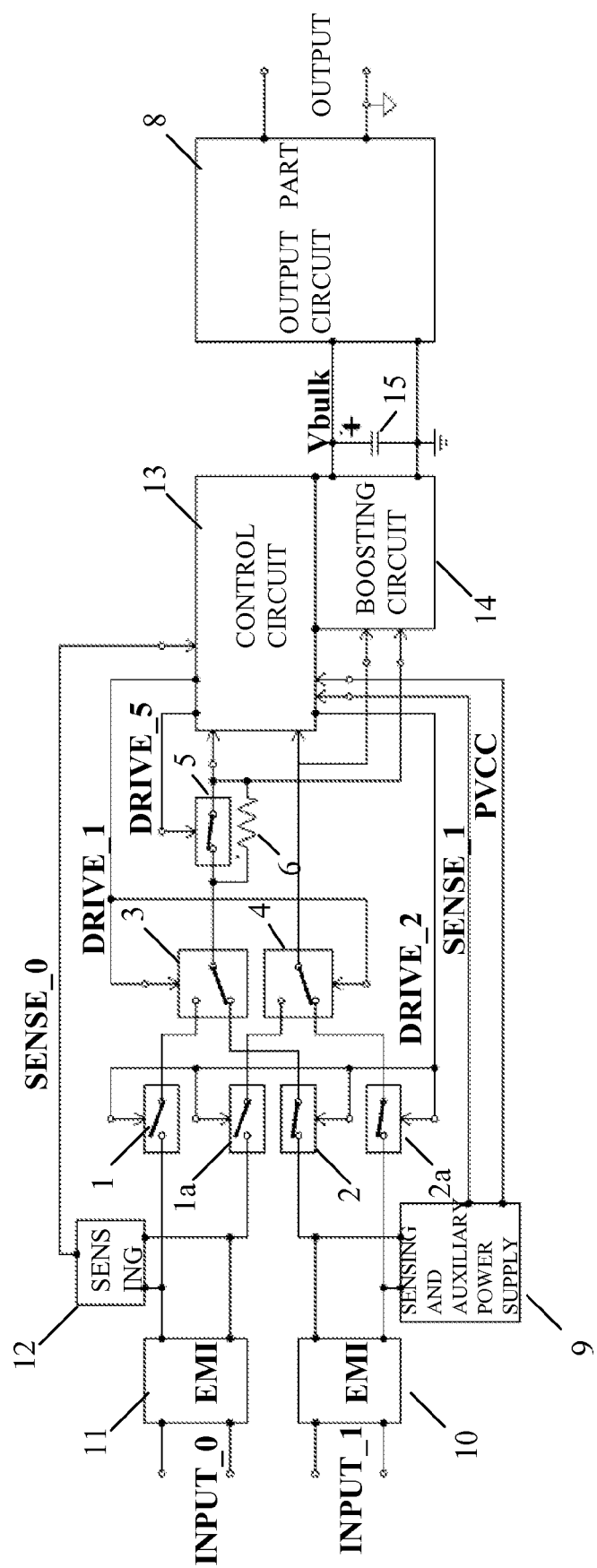
FIG. 6 is a schematic diagram illustrating an input redundant circuit according to an embodiment of the present disclosure.

It should be noted that the control unit included in the core power supply unit and the surge current limiting unit included in the above-mentioned input redundant circuit according to the embodiment of the present disclosure may be achieved commonly by means of the control circuit 13 as shown in FIG. 6. The control circuit 13 may be achieved in the way known by those skilled in the art such as a microprocessor, or may also be achieved by means of other hardware circuit, to which the present disclosure has no specific limitation.

In the case that the switching is achieved from the input voltage INPUT_0 to the input voltage INPUT_1, the normally-closed relays 1 and 1a are opened, the normally-opened relays 2 and 2a are closed, the normally-closed contacts of the relays 3 and 4 are opened and the normally-opened contacts of the relays 3 and 4 are closed, as shown in FIG. 6. During the switching from the input voltage INPUT_0 to the input voltage INPUT_1, there is no effect on the relay 5 in the surge current limiting circuit and the relay 5 is always closed.

On the other hand, in the case that it is necessary to switch from the input voltage INPUT_1 to the input voltage INPUT_0, the process similar to the above-mentioned process may be used, which is not repeated any more in the present disclosure.

In the input redundant circuit described above according to the embodiment of the present disclosure, the switching from one input voltage to the other input voltage may be achieved by selecting the right time for sending the control signal without operation on the surge current limiting circuit.

Next, an input redundant circuit according to another embodiment of the present disclosure will be described. In the input redundant circuit, the switching from one input voltage to the other input voltage may be achieved by operating on the surge current limiting circuit, without considering the time for sending the control signal.

Figure 7:
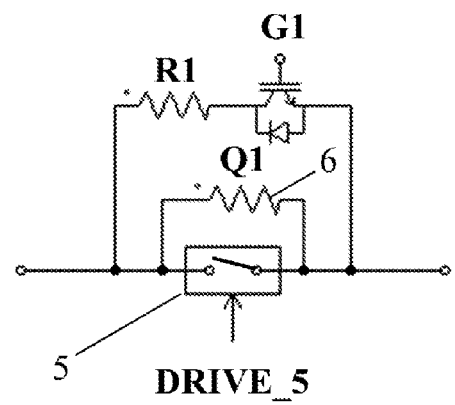
FIG. 7 is a circuit diagram illustrating an example of a surge current limiting unit included in an input redundant circuit according to an embodiment of the present disclosure.

As shown in FIG. 7, the surge current limiting unit included in the input redundant circuit according to another embodiment of the present disclosure may include a relay 5, resistors 6 and R1 and a semiconductor device Q1. The relay 5 and the resistor 6 constitutes the surge current limiting circuit which is coupled to the relay unit and is used to limit the surge current generated by the input voltage INPUT_0 and the input voltage INPUT_1. The resistor R1 and the semiconductor device Q1 constitutes an acceleration circuit which is connected with the surge current limiting circuit in parallel and is configured to shorten the connection time of the surge current limiting circuit and may greatly reduce the switching current of the relay 5.

In general, the nominal resistance of the resistor 6 is 10 ohms. The semiconductor device Q1 may be an insulated gate bipolar transistor (IGBT), a metal oxide semiconductor field effect transistor (MOSFET), a silicon controlled rectifier (SCR) and the like. The resistor R1 is a resistor with low resistance, of which the resistance value may range from 0 ohm to 1 ohm, depending on the rated value of the surge current of the semiconductor device Q1.

The base signal G1 of the semiconductor device Q1 may come from the core power supply unit. The resistor R1 is connected to the collector of the semiconductor device Q1, and the emitter of the semiconductor device Q1 is connected to the relay 5. It should be noted that the resistor R1 just needs to be connected to the semiconductor device Q1. For example, the resistor R1 may also be connected between the emitter of the semiconductor device Q1 and the relay 5, to which the present disclosure has no specific limitation. A diode connected with the semiconductor device Q1 in parallel may have protective effect.

The connection time delay and the disconnection time delay of the relay 5 is counted in millisecond (such as 3 ms), and the connection time delay and the disconnection time delay of the semiconductor device Q1 is counted in microsecond (such as 3 μs). This is the reason why the parallel connection of the acceleration circuit and the surge current limiting circuit may shorten the connection time of the entire surge current limiting circuit.

Figure 8:
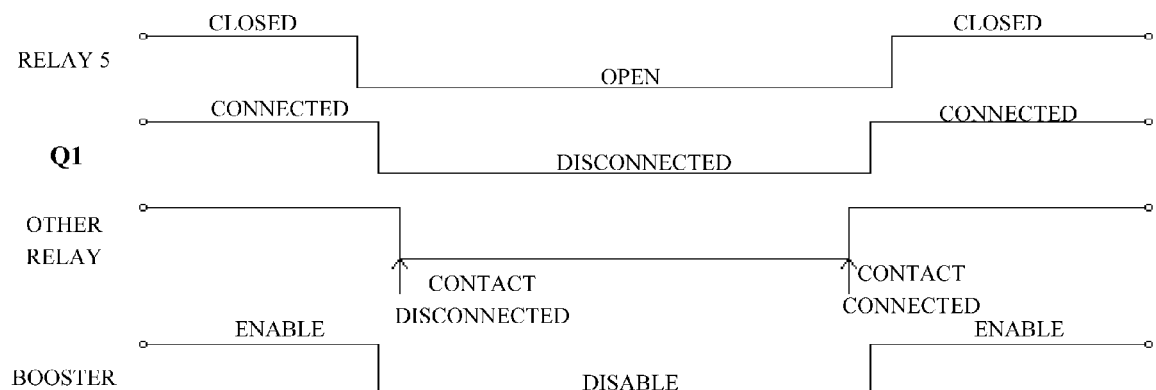
FIG. 8 is a waveform graph illustrating the operation of the surge current limiting unit as illustrated in FIG. 7.

As an example, with reference to FIG. 3 and FIG. 7 and as shown in FIG. 8, in the case that both the input voltage INPUT_1 and the input voltage INPUT_0 exist, the input voltage INPUT_0 may be autonomously connected to the input part circuit (that is, the control circuit 13 and the boosting circuit 14) of the core power supply unit. The input voltage INPUT_0 may supply power to the core power supply unit, and the relay 5 may be closed after the capacitor 15 is peak charged. The boosting circuit 14 then may boost the capacitance-voltage Vbulk to a higher voltage (for example, 395 Vdc). The input voltage INPUT_1 may be isolated from the core power supply unit and the input voltage INPUT_0 by means of the normally-opened relays 2 and 2a and the normally-opened contacts of the relays 3 and 4. In the case that the input voltage INPUT_0 becomes bad (the signal is lost or weakened), the control circuit 13 may send drive signals such as DRIVE_1 and DRIVE_2 to activate the relay unit constituted of the relays 1, 1a, 2, 2a, 3 and 4, to connect the input voltage INPUT_1. However, during the switching from the input voltage INPUT_0 to the input voltage INPUT_1, the capacitance-voltage Vbulk may drop after the input voltage INPUT_0 is disconnected. When the input voltage INPUT_1 is connected, the surge current may be generated in the case that the instant voltage of the input voltage INPUT_1 is higher than the capacitance-voltage Vbulk. In the case that the generated surge current is not limited, the input redundant circuit may be damaged.

In order to limit the surge current generated when the relay unit is switched between the input voltage INPUT_0 and the input voltage INPUT_1, firstly the control circuit 13 may send a control signal DRIVE_5 to disconnect the relay 5 before the control circuit 13 sends a control signal to disconnect the input voltage INPUT_0 in the case that the input voltage INPUT_0 becomes bad (the signal is lost or weakened). The semiconductor device Q1 may be disconnected after the relay 5 is disconnected. At this point, the control circuit 13 may also disable the boosting circuit 14, so that the input current is stopped to flow before any relay is activated.

Next, the control circuit 13 may send a control signal to activate other relays constituted of the relay unit, so that the contacts of the relay unit are disconnected. Furthermore, the control circuit 13 may send a control signal to activate other relays constituted of the relay unit, so that the contacts of the relay unit are connected. When the contacts of the relay unit are connected, even if the instant voltage of the input voltage INPUT_1 is higher than the capacitance-voltage Vbulk, the input current may flow through the resistor 6 and therefore the surge current is limited, since both the relay 5 and the semiconductor device Q1 are opened (disconnected).

Next, the semiconductor device Q1 and the relay 5 are connected successively after the control circuit 13 sends a control signal to connect the input voltage INPUT_1. As described above, since the connection time delay and the disconnected time delay of the relay 5 is counted in millisecond and the connection time delay and the disconnected time delay of the semiconductor device Q1 is counted in microsecond, the connection time of the entire surge current limiting circuit may be shortened. Additionally, since the relay 5 is disconnected before the semiconductor device Q1 is disconnected and the relay 5 is connected after the semiconductor device Q1 is connected, the switching current of the relay 5 may be greatly reduced.

In this period, in the case that the control circuit 13 disables the boosting circuit 14 previously, the boosting circuit 14 may be enabled before or after the control circuit 13 sends the control signal to connect the input voltage INPUT_1, and therefore the switching is achieved from the input voltage INPUT_0 to the input voltage INPUT_1.

The input redundant circuit described above according to the embodiment of the present disclosure may also limit the breaking current and connecting current of the relay unit. On the other hand, in the case that it is necessary to switch from the input voltage INPUT_1 to the input voltage INPUT_0, the process similar to the above-mentioned process may be used, which is not repeated any more in the present disclosure.

In addition, it should be noted that the surge current limiting circuit may be placed at any location in the path of the input power to limit the surge current, but not limited to the location as shown in FIG. 2 and FIG. 3, in the technical solution according to the embodiment of the present disclosure.

Furthermore, the relay unit is not limited to the relays 1, 1a, 2, 2a, 3 and 4 as shown in FIG. 2 and FIG. 3, in the technical solution according to the embodiment of the present disclosure.

Figure 9:
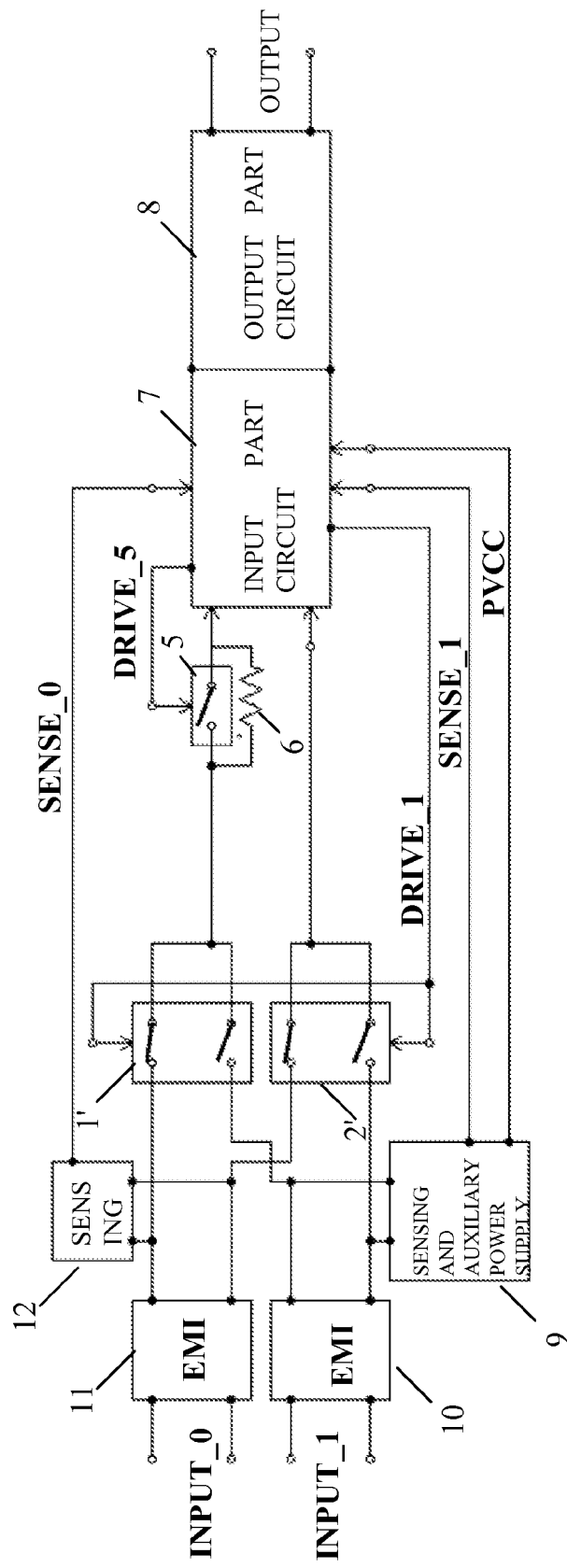
FIG. 9 is a schematic diagram illustrating an input redundant circuit according to another embodiment of the present disclosure.

As shown in FIG. 9, the relay unit included in the input redundant circuit according to the embodiment of the present disclosure may include the relays 1' and 2'. The relays 1' and 2' may have a normally-closed contact and a normally-opened contact, respectively. The normally-closed contacts of the relays 1' and 2' are connected to EMI 11, and the normally-opened contacts of the relays 1' and 2' are connected to EMI 10. The relays 1' and 2' as shown in FIG. 9 may also realize the function of the relay unit included in the input redundant circuit according to the embodiment of the present disclosure. The rest of the input redundant circuit shown in FIG. 9 is similar to that in FIG. 2 and FIG. 3, which is not repeated any more herein.

Figure 10:
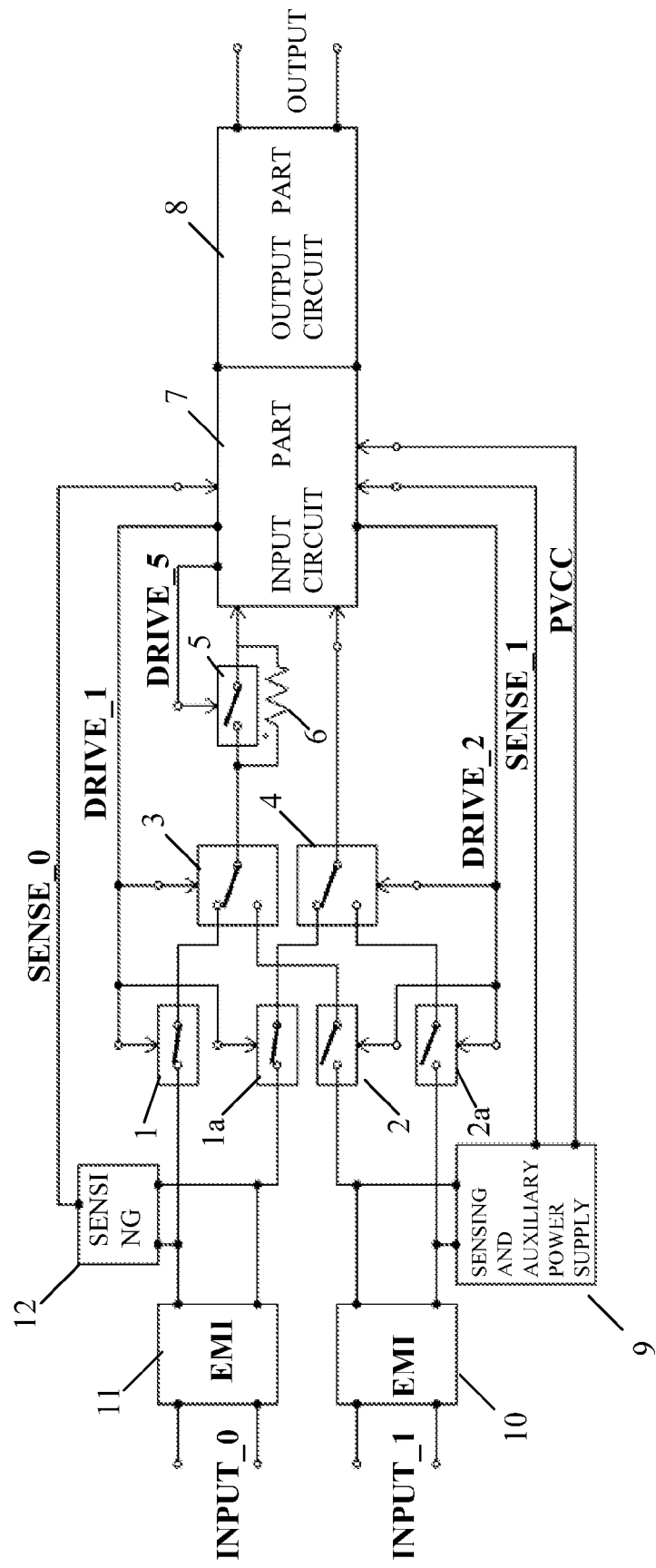
FIG. 10 is a schematic diagram illustrating an input redundant circuit according to another embodiment of the present disclosure.

Furthermore, as shown in FIG. 2 and FIG. 3, the relays 3 and 4 are controlled by the same control signal DRIVE_1, and the relays 1, 1a, 2 and 2a are controlled by the same control signal DRIVE_2. The present disclosure is not limited thereto. As shown in FIG. 10, the relays 1, 1a and 3 are controlled by the same control signal DRIVE_1, and the relays 2, 2a and 4 are controlled by the same control signal DRIVE_2. The change of the control signal has no effect on the function of the relay unit included in the input redundant circuit according to the embodiment of the present disclosure.

Figure 11:
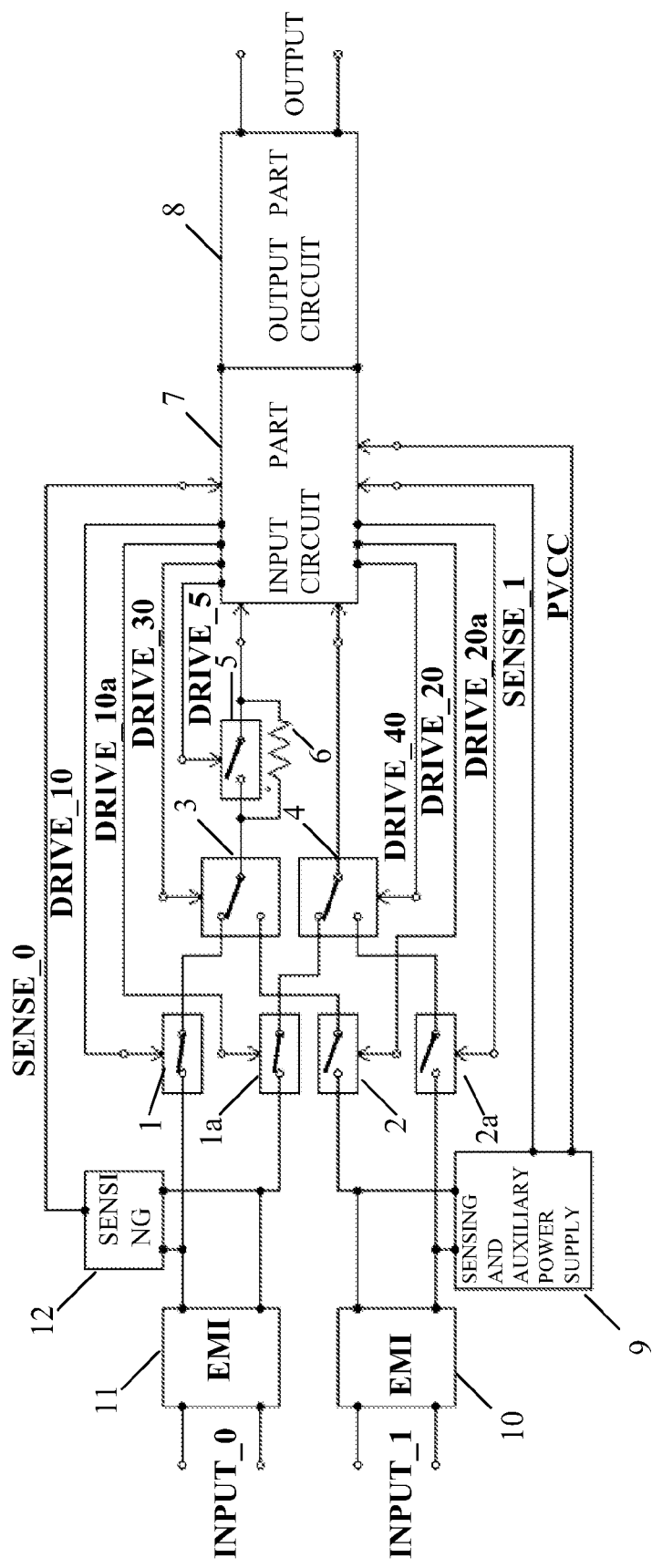
FIG. 11 is a schematic diagram illustrating an input redundant circuit according to another embodiment of the present disclosure.

Furthermore, as shown in FIG. 11, the relay 1 is controlled by a control signal DRIVE_10, the relay 1a is controlled by a control signal DRIVE_10a, the relay 2 is controlled by a control signal DRIVE_20, the relay 2a is controlled by a control signal DRIVE_20a, the relay 3 is controlled by a control signal DRIVE_30, and the relay 4 is controlled by a control signal DRIVE_40. In other words, the relays 1, 1a, 2, 2a, 3 and 4 may be controlled by different control signals, respectively. The change of the control signal also has no effect on the function of the relay unit included in the input redundant circuit according to the embodiment of the present disclosure.

Figure 12:
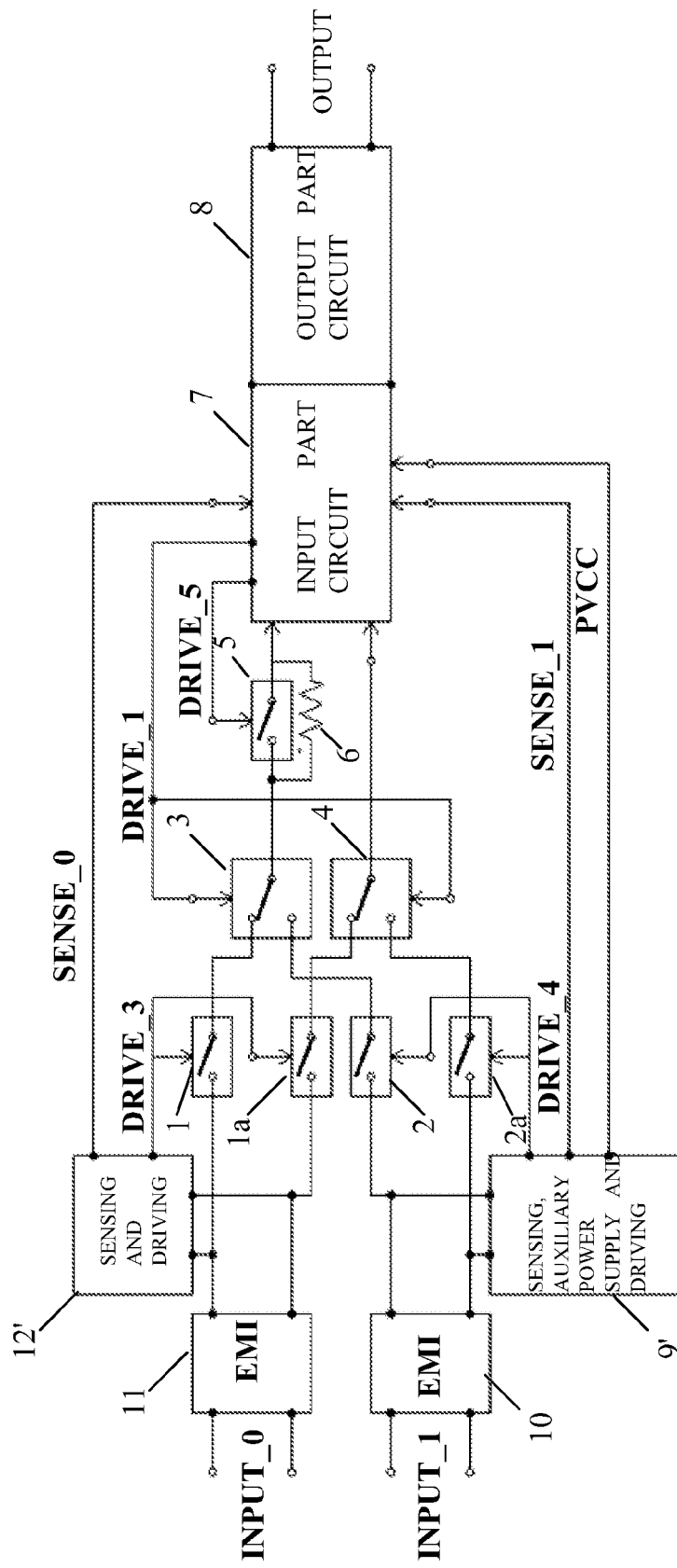
FIG. 12 is a schematic diagram illustrating an input redundant circuit according to another embodiment of the present disclosure.

Furthermore, as shown in FIG. 2 and FIG. 3, the relays 1 and 1a are normally-closed relays, but the present disclosure is not limited thereto. As shown in FIG. 12, the relays 1 and 1a may also be the normally-opened relays. In the technical solution as shown in FIG. 12, the sensing circuit 12 shown in FIG. 2 and FIG. 3 is replaced by a sensing and driving circuit 12', and the sensing and auxiliary power supply circuit 9 shown in FIG. 2 and FIG. 3 is replaced by a sensing, auxiliary power supply and driving circuit 9'. The driving circuit part of the sensing and driving circuit 12' may drive the normally-opened relays 1 and 1a by a control signal DRIVE_3 by means of the input voltage INPUT_0. The driving circuit part of the sensing, auxiliary power supply and driving circuit 9' may drive the normally-opened relays 2 and 2a by a control signal DRIVE_4 by means of the input voltage INPUT_1. Since the relays 1, 1a, 2 and 2a are the normally-opened relays, the driving circuit must be provided to close the relays 1, 1a, 2 and 2a before being powered. Certainly, the driving circuit part may be provided in only one of the sensing and driving circuit 12' and the sensing, auxiliary power supply and drive circuit 9', and it is not necessary to provide the driving circuit part in both the sensing and driving circuit 12' and the sensing, auxiliary power supply and drive circuit 9'.

Figure 13:
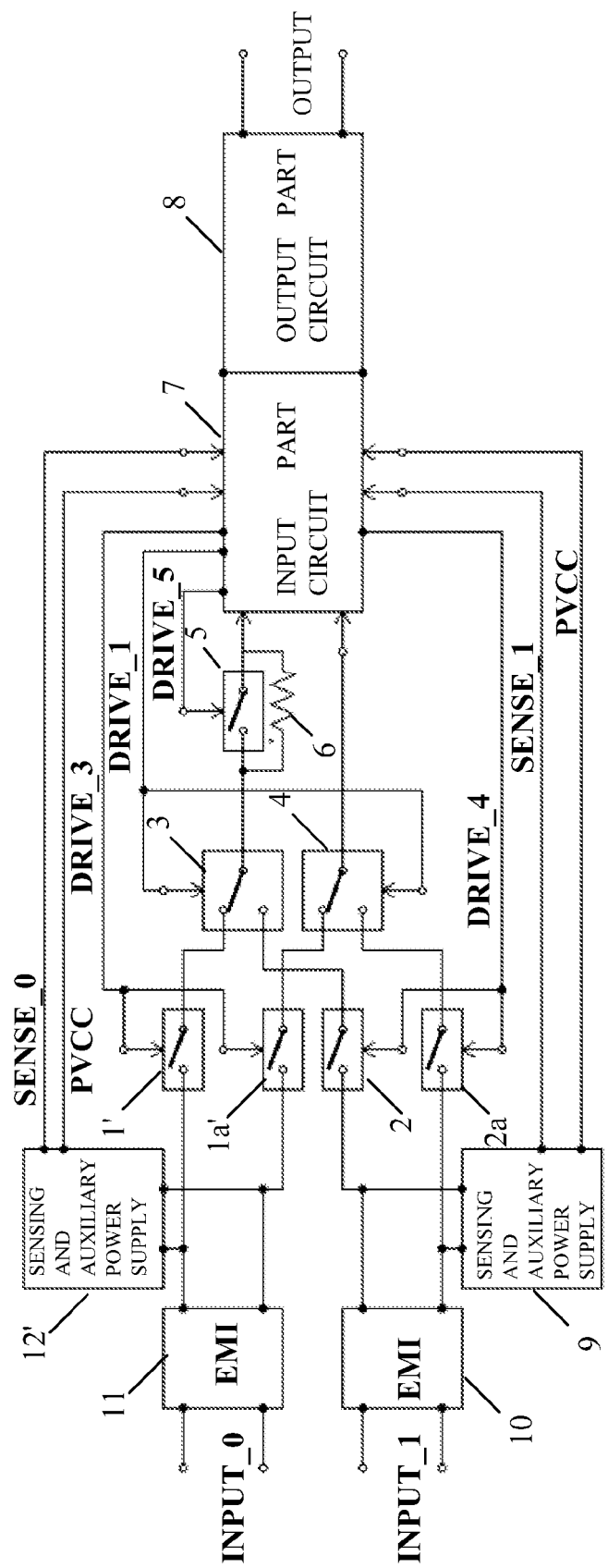
FIG. 13 is a schematic diagram illustrating an input redundant circuit according to another embodiment of the present disclosure.

Furthermore, as shown in FIG. 13, the relays 1' and 1a' may also be the normally-opened relays. In the technical solution as shown in FIG. 13, the sensing circuit 12 shown in FIG. 2 and FIG. 3 is replaced by a sensing and auxiliary power supply circuit 12'. In addition, the relays 1' and 1a' are controlled by a control signal DRIVE_3, and the relays 2 and 2a are controlled by a control signal DRIVE_4. Since the relays 1', 1a', 2 and 2a are the normally-opened relays, the auxiliary power supply circuit must be provided to supply a bias power to the core power supply unit before being powered. The auxiliary power supply circuit part of the sensing and auxiliary power supply circuit 12' may supply a bias power PVCC to the core power supply unit by means of the input voltage INPUT_0. The auxiliary power supply circuit part of the sensing and auxiliary power supply circuit 9 may supply the bias power PVCC to the core power supply unit by means of the input voltage INPUT_1. Certainly, the auxiliary power supply circuit part may be provided in only one of the sensing and auxiliary power supply circuit 12' and the sensing and auxiliary power supply circuit 9, and it is not necessary to provide the auxiliary power supply circuit part in both the sensing and auxiliary power supply circuit 12' and the sensing and auxiliary power supply circuit 9.

The input redundant circuit according to the embodiments of the present disclosure may be applicable to any AC-DC or DC-DC power supply which may have a boosting circuit or a PFC of boosting type.

The input redundancy may be achieved in a single unit according to the embodiments of the present disclosure. Thus, the input redundancy can be achieved with less cost, and the power density in system level can be increased. In addition, the arrangement of relays in the input redundant circuit according to the embodiments of the present disclosure can prevent two input voltages from being shortened due to an incorrect control sequence, and the drive sequence can prevent high switching current at the relay contact from happening.

Although the embodiment of the present disclosure has been described in detail in combination with the drawings above, it should be understood that, the embodiment described above is only used to explain the invention and is not constructed as the limitation to the present disclosure. For those skilled in the art, various modification and alternation can be made to the above embodiment without departing from the essential and scope of the present disclosure. Therefore, the scope of the present disclosure is only defined by the appended claims and the equivalents thereof.

The invention claimed is:

1. An input redundant circuit, comprising:
a core power supply;
a first input port for receiving a first input voltage;
a second input port for receiving a second input voltage;
a relay connected to the first input port and the second input port to selectively connect and disconnect the first input voltage and the second input voltage to the core power supply;
a boosting circuit to boost one of the first input voltage and the second input voltage connected by the relay;
a control circuit configured to disable the boosting circuit before the relay disconnects one of the first input voltage and the second input voltage from the core power supply; and
a surge current limiting circuit coupled to the core power supply, and configured to limit a surge current generated when the relay is switched between the first input voltage and the second input voltage.

2. The input redundant circuit according to claim 1, wherein the relay comprises:
a normally-closed relay connected to the first input port;
a normally-open relay connected to the second input port; and
a double-contact relay, wherein a normally-closed contact of the double-contact relay is connected to the normally-closed relay and a normally-open contact of the double-contact relay is connected to the normally-open relay.

3. The input redundant circuit according to claim 1, wherein the relay comprises:
a first relay having a first normally-closed contact and a first normally-open contact; and
a second relay having a second normally-closed contact and a second normally-open contact,
wherein the first normally-closed contact and the second normally-closed contact are connected to the first input port, and the first normally-open contact and the second normally-open contact are connected to the second input port.

4. The input redundant circuit according to claim 1, wherein the relay comprises:
a first normally-open relay connected to the first input port;
a second normally-open relay connected to the second input port; and
a double-contact relay, wherein a normally-closed contact of the double-contact relay is connected to the first normally-open relay and a normally-open contact of the double-contact relay is connected to the second normally-open relay, and
the input redundant circuit further comprises:
a first relay drive circuit coupled to the first input port to drive the first normally-open relay from the first input voltage; and/or
a second relay drive circuit coupled to the second input port to drive the second normally-open relay from the second input voltage.

5. The input redundant circuit according to claim 2, further comprising:
an auxiliary power supply circuit coupled to the second input port to supply a bias power to the core power supply from the second input voltage.

6. The input redundant circuit according to claim 1, wherein the relay comprises:
a first normally-open relay connected to the first input port;
a second normally-open relay connected to the second input port; and
a double-contact relay, wherein a normally-closed contact of the double-contact relay is connected to the first normally-open relay and a normally-open contact of the double-contact relay is connected to the second normally-open relay, and
the input redundant circuit further comprises:
a first auxiliary power supply circuit coupled to the first input port to supply a bias power to the core power supply from the first input voltage; and/or
a second auxiliary power supply circuit coupled to the second input port to supply a bias power to the core power supply from the second input voltage.

7. The input redundant circuit according to claim 1, further comprising:
a first sensing circuit coupled to the first input port to sense whether the first input voltage works properly, and supply a first sense signal to the core power supply for indicating whether the first input voltage works properly; and
a second sensing circuit coupled to the second input port to sense whether the second input voltage works properly, and supply a second sense signal to the core power supply for indicating whether the second input voltage works properly.

8. The input redundant circuit according to claim 7, wherein
the relay is configured to supply the first input voltage to the core power supply by default, and
the core power supply is configured to control, based on the first sense signal and the second sense signal, the relay to be switched from one of the first input voltage and the second input voltage to the other of the first input voltage and the second input voltage.

9. The input redundant circuit according to claim 1, wherein the control circuit is configured to generate a first control signal and a second control signal, wherein the first control signal is used to control the relay to disconnect one of the first input voltage and the second input voltage from the core power supply, and the second control signal is used to control the relay to connect the other of the first input voltage and the second input voltage to the core power supply;

the input redundant circuit further comprising a capacitor powered by the boosting circuit.

10. The input redundant circuit according to claim 9, wherein the control circuit is configured to disable the boosting circuit in response to the first control signal.

11. The input redundant circuit according to claim 10, wherein the control circuit is configured to enable the boosting circuit in response to the second control signal.

12. The input redundant circuit according to claim 10, wherein the surge current limiting circuit is adapted to generate, based on a capacitance-voltage supplied by the capacitor and a supply voltage which is the other of the first input voltage and the second input voltage, a surge current limiting signal for indicating a period of time during which the supply voltage is less than the capacitance-voltage, and the control circuit is configured to generate, based on the surge current limiting signal, the second control signal to control the relay to connect the other of the first input voltage and the second input voltage to the core power supply in the period of time.

13. The input redundant circuit according to claim 9, further comprising an acceleration circuit connected with the surge current limiting circuit in parallel to shorten the connection time of the surge current limiting circuit.

14. The input redundant circuit according to claim 13, wherein:

the acceleration circuit includes a switch;

the control circuit is configured to open the switch of the acceleration circuit before the control circuit generates the first control signal, and is to close the switch of the acceleration circuit after the control circuit generates the second control signal, and the surge current limiting circuit comprises:

a limiting relay, the control circuit configured to open the limiting relay before the switch of the acceleration circuit is opened, and to close the limiting relay after the switch of the acceleration circuit is closed; and a limiting resistor connected with the limiting relay in parallel to limit the surge current.

15. The input redundant circuit according to claim 13, wherein the switch of the acceleration circuit comprises a semiconductor device.

16. The input redundant circuit according to claim 3, further comprising:

an auxiliary power supply circuit coupled to the second input port to supply a bias power to the core power supply from the second input voltage.

17. The input redundant circuit according to claim 4, further comprising:

an auxiliary power supply circuit coupled to the second input port to supply a bias power to the core power supply from the second input voltage.

* * * * *